US012139631B2

(12) United States Patent
LaFleur et al.

(10) Patent No.: US 12,139,631 B2
(45) Date of Patent: Nov. 12, 2024

(54) AQUEOUS COMPOSITION COMPRISING MULTI-STAGE LATEX POLYMER PARTICLES

(71) Applicant: Rohm and Haas Company, Collegeville, PA (US)

(72) Inventors: Edward E. LaFleur, Holland, PA (US); Himal H. Ray, Collegeville, PA (US); Edwin Aloysius Nungesser, Jr., Collegeville, PA (US)

(73) Assignee: Rohm and Haas Company, Collegeville, PA (US)

( * ) Notice: Subject to any disclaimer, the term of this patent is extended or adjusted under 35 U.S.C. 154(b) by 707 days.

(21) Appl. No.: 17/278,917

(22) PCT Filed: Sep. 20, 2019

(86) PCT No.: PCT/US2019/052114
§ 371 (c)(1),
(2) Date: Mar. 23, 2021

(87) PCT Pub. No.: WO2020/068577
PCT Pub. Date: Apr. 2, 2020

(65) Prior Publication Data

US 2021/0395556 A1 Dec. 23, 2021

Related U.S. Application Data

(60) Provisional application No. 62/736,606, filed on Sep. 26, 2018.

(51) Int. Cl.

| | |
|---|---|
| ***C09D 133/08*** | (2006.01) |
| ***C08F 220/18*** | (2006.01) |
| ***C08L 33/08*** | (2006.01) |
| ***D04H 1/587*** | (2012.01) |
| ***D06N 3/00*** | (2006.01) |
| ***D06N 3/04*** | (2006.01) |

(52) U.S. Cl.
CPC ...... *C09D 133/08* (2013.01); *C08F 220/1802* (2020.02); *C08F 220/1804* (2020.02); *C08L 33/08* (2013.01); *D04H 1/587* (2013.01); *D06N 3/0011* (2013.01); *D06N 3/042* (2013.01); *D06N 3/045* (2013.01); *C08F 2800/20* (2013.01); *C08L 2205/025* (2013.01); *C08L 2205/18* (2013.01)

(58) Field of Classification Search
CPC ............... C09D 133/08; C08F 2800/20; C08F 220/1804; C08F 220/1802; C08L 2205/025; C08L 33/08; C08L 2205/18
USPC .......................................................... 524/504
See application file for complete search history.

(56) References Cited

U.S. PATENT DOCUMENTS

| | | | | |
|---|---|---|---|---|
| 4,247,434 | A | 1/1981 | Lovelace et al. | |
| 5,069,721 | A | 12/1991 | Tamura et al. | |
| 5,071,902 | A * | 12/1991 | Langerbeins | D06M 15/29 524/460 |
| 5,143,954 | A | 9/1992 | Hutton et al. | |
| 6,380,353 | B1 | 4/2002 | Rupaner et al. | |
| 6,753,383 | B2 | 6/2004 | Schaefer et al. | |
| 7,829,626 | B2 | 11/2010 | Chiou et al. | |
| 8,030,395 | B2 | 10/2011 | Tseng et al. | |
| 8,686,096 | B2 | 4/2014 | Deetz et al. | |
| 2003/0109630 | A1 * | 6/2003 | Smith | C09J 7/385 524/533 |
| 2007/0218291 | A1 | 9/2007 | Chiou et al. | |
| 2008/0206558 | A1 | 8/2008 | Tseng et al. | |
| 2013/0149929 | A1 | 6/2013 | Boylan et al. | |

FOREIGN PATENT DOCUMENTS

| | | | |
|---|---|---|---|
| EP | 0647658 | B1 | 11/1998 |
| EP | 2788391 | B1 | 10/2015 |

* cited by examiner

*Primary Examiner* — Kelechi C Egwim
(74) *Attorney, Agent, or Firm* — Boyle Fredrickson, S.C.

(57) ABSTRACT

The present disclosure provides an aqueous composition. The aqueous composition includes multi-stage latex polymer particles. The multi-stage latex polymer particles include (A) a first-stage polymer containing (i) an n-methylol functional monomer and (ii) a first vinyl monomer; and (B) a second-stage polymer containing (i) a formaldehyde-scavenging monomer and (ii) a second vinyl monomer. The first-stage polymer is bound to the second-stage polymer.

19 Claims, No Drawings

AQUEOUS COMPOSITION COMPRISING MULTI-STAGE LATEX POLYMER PARTICLES

BACKGROUND

Aqueous compositions containing latex polymer particles are used as binders for textiles. The latex polymers are desirably self-crosslinking and are traditionally formed with monomers having n-methylol functionality, such as n-methylol acrylamide (MOA) monomer, because it enhances the mechanical properties of an article formed from a textile coated with the aqueous composition. However, n-methylol functional monomers are known to generate formaldehyde as a byproduct of the self-crosslinking mechanism during film formation.

The art recognizes the need for an aqueous composition containing latex polymer particles that is suitable for use as a crosslinkable binder for textiles. The art further recognizes the need for an aqueous composition containing latex polymer particles that contains an acceptable amount of formaldehyde.

SUMMARY

The present disclosure provides an aqueous composition. The aqueous composition includes multi-stage latex polymer particles. The multi-stage latex polymer particles include (A) a first-stage polymer containing (i) an n-methylol functional monomer and (ii) a first vinyl monomer; and (B) a second-stage polymer containing (i) a formaldehyde-scavenging monomer and (ii) a second vinyl monomer. The first-stage polymer is bound to the second-stage polymer.

The present disclosure provides another aqueous composition. The aqueous composition includes multi-stage latex polymer particles. The multi-stage latex polymer particles include (A) a first-stage polymer containing (i) n-methylol acrylamide and (ii) a first vinyl monomer; and (B) a second-stage polymer containing (i) n-(2-methacryloyloxyethylene) ethylene urea and (ii) a second vinyl monomer. The first-stage polymer is bound to the second-stage polymer.

The present disclosure also provides an article. The article includes a nonwoven textile and a coating on the textile, the coating including a composition containing multi-stage latex polymer particles. The multi-stage latex polymer particles include (A) a first-stage polymer containing (i) an n-methylol functional monomer and (ii) a first vinyl monomer; and (B) a second-stage polymer containing (i) a formaldehyde-scavenging monomer and (ii) a second vinyl monomer. The first-stage polymer is bound to the second-stage polymer.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

"Alkyl" and "alkyl group" refer to a saturated linear, cyclic, or branched hydrocarbon group. Nonlimiting examples of suitable alkyl groups include methyl, ethyl, n-propyl, i-propyl, n-butyl, t-butyl, i-butyl (or 2-methylpropyl), etc. In one embodiment, the alkyl group has from 1 to 20 carbon atoms.

"Alkenyl" or "alkenyl group" refer to a hydrocarbyl group containing at least one C═C double bond. Alkenyl groups may be linear, cyclic or branched. Nonlimiting examples of suitable alkenyl groups include ethenyl groups, n-propenyl groups, i-propenyl groups, n-butenyl groups, t-butenyl groups, i-butenyl groups, etc.

"Aqueous" refers to a composition containing water. An aqueous composition includes from 20 wt %, or 25 wt %, or 30 wt %, or 35 wt %, or 40 wt %, or 45 wt %, or 50 wt %, or 55 wt %, or 60 wt %, or 65 wt %, or 70 wt % to 75 wt %, or 80 wt %, or 85 wt %, or 90 wt %, or 95 wt %, or 99 wt %, or less than 100 wt % water, based on the total weight of the aqueous composition.

"Aralkyl" and "aralkyl group" refer to an organic radical derived from aromatic hydrocarbon by replacing one or more hydrogen atoms with an aryl group.

"Aryl" and "aryl group" refer to an organic radical derived from aromatic hydrocarbon by deleting one hydrogen atom therefrom. An aryl group may be a monocyclic and/or fused ring system, each ring of which suitably contains from 5 to 7, preferably from 5 or 6 atoms. Structures wherein two or more aryl groups are combined through single bond(s) are also included. Specific examples include, but are not limited to, phenyl, tolyl, naphthyl, biphenyl, anthryl, indenyl, fluorenyl, benzofluorenyl, phenanthryl, triphenylenyl, pyrenyl, perylenyl, chrysenyl, naphtacenyl, fluoranthenyl and the like.

"Blend," "polymer blend" and like terms refer to a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method used to measure and/or identify domain configurations.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Crosslinkable" and "curable" indicate that the polymer, before or after shaped into an article, is not cured or crosslinked and has not been subjected or exposed to treatment that has induced substantial crosslinking although the polymer comprises additive(s) or functionality that will effectuate substantial crosslinking upon subjection or exposure to such treatment (e.g., exposure to water, or drying).

"Crosslinked" and similar terms indicate that the polymer composition, before or after it is shaped into an article, has xylene or decalin extractables of less than or equal to 90 weight percent (i.e., greater than or equal to 10 weight percent gel content).

A "diene" is an unsaturated hydrocarbon containing two double bonds between carbon atoms. The diene can be conjugated-, non-conjugated-, straight chain-, branched chain- or cyclic-hydrocarbon diene having from 6 to 15 carbon atoms. Nonlimiting examples of suitable diene include 1,4-hexadiene; 1,6-octadiene; 1,7-octadiene; 1,9-decadiene.

"Fabric" is a woven structure or a non-woven (such as knitted) structure formed from individual fibers or yarn.

"Fiber" and like terms refer to an elongated column of entangled filaments. Fiber diameter can be measured and reported in a variety of fashions. Generally, fiber diameter is measured in denier per filament. Denier is a textile term which is defined as the grams of the fiber per 9,000 meters of that fiber's length. Monofilament generally refers to an extruded strand having a denier per filament greater than 15, usually greater than 30. Fine denier fiber generally refers to fiber having a denier of 15 or less. Microdenier (aka microfiber) generally refers to fiber having a diameter not greater than 100 micrometers.

"Filament" and like terms refer to a single, continuous strand of elongated material having generally round cross-section and a length to diameter ratio of greater than 10.

A "halogen" is an element in IUPAC Group 17 of the Periodic Table of Elements, which includes fluorine (F), chlorine (Cl), bromine (Br), iodine (I), and astatine (At).

A "heteroatom" is an atom other than carbon or hydrogen. The heteroatom can be a non-carbon atom from Groups IV, V, VI and VII of the Periodic Table. Nonlimiting examples of heteroatoms include: F, N, O, P, B, S, and Si.

The terms "hydrocarbyl" and "hydrocarbon" refer to substituents containing only hydrogen and carbon atoms, including branched or unbranched, saturated or unsaturated, cyclic, polycyclic or noncyclic species. Nonlimiting examples include alkyl-, cycloalkyl-, alkenyl-, alkadienyl-, cycloalkenyl-, cycloalkadienyl-, aryl-, and alkynyl-groups.

A "knitted fabric" is formed from intertwining yarn or fibers in a series of connected loops either by hand, with knitting needles, or on a machine. The fabric may be formed by warp or weft knitting, flat knitting, and circular knitting. Nonlimiting examples of suitable warp knits include tricot, raschel powernet, and lacing. Nonlimiting examples of suitable weft knits include circular, flat, and seamless (which is often considered a subset of circular knits).

A "latex polymer" is a polymeric compound prepared by aqueous emulsion polymerization. Latex polymers exist as particles suspended throughout a continuous aqueous medium, which is a stable dispersion.

"Nonwoven" refers to a web or a fabric having a structure of individual fibers or threads which are randomly interlaid, but not in an identifiable manner as is the case of a knitted fabric.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

"Substituted hydrocarbyl" and "substituted hydrocarbon" refer to a hydrocarbyl group that is substituted with one or more non-hydrocarbyl substituent groups. Nonlimiting examples of a non-hydrocarbyl substituent group include a heteroatom, heteroatom-containing moieties, oxygen-containing moieties (e.g., alcohol, acrylate, acrylic acid, aldehyde, carboxylic acid, ester, ether, ketone, and peroxide groups), and nitrogen-containing moieties (e.g., amide, amine, azo, imide, imine, nitrate, nitrile, and nitrite groups).

A "textile" is a flexible material composed of a network of natural fibers, artificial fibers, and combinations thereof. Textile includes fabric and cloth.

A "urea" or "urea group" is a substituent group having the following Structure (A):

Structure (A)

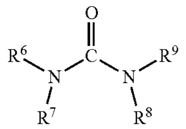

wherein $R^6$, $R^7$, $R^8$, and $R^9$ each is independently selected from hydrogen, a halogen, a hydrocarbyl, a substituted hydrocarbyl, an acrylic monomer, and combinations thereof; and $R^7$ and $R_8$ may optionally form a cyclic structure or an aromatic structure.

"Weight of the polymer" refers to the dry weight of the polymer.

"Woven" refers to a web or a fabric having a structure of individual fibers or threads which are interlaid in a pattern in an identifiable manner. A nonlimiting example of a woven fabric is a knitted fabric.

"Yarn" is a continuous length of twisted or otherwise entangled filaments that can be used in the manufacture of woven or knitted fabrics.

Test Methods $D_{50}$ particle size is measured using a Coulter LS 230 Laser Light Scattering Particle Sizer, available from Coulter Corporation. D50 particle size is the particle diameter at which 50% of the MSLPP's mass is composed of particles with a diameter less than this value and 50% of the MSLPP's mass is composed of particles with a diameter greater than said value. Particle size is measured in microns (μm).

Glass transition temperature (Tg) is measured according to ASTM-D3418-15.

Gloss is measured at 60° and 85° geometry using a Micro-TRI-gloss meter (cat. No. 4448, BYK-Gardner GmbH). Gloss is determined after applying the aqueous composition onto a Leneta 5C opacity chart using a 3 mil wet bird applicator, and drying the aqueous composition in an oven at 105° C. for 5 minutes to form a film. The film is cured at room temperature overnight. Specular gloss is measured in percent reflection (%).

Tack is determined after applying the aqueous composition onto a Leneta 5C opacity chart using a 3 mil wet bird applicator, and drying the aqueous composition in an oven at 105° C. for 5 minutes to form a film. The film is cured at room temperature overnight. The aqueous composition forms a coating surface on the opacity chart. A subjective ranking from 1 to 4 is applied after rubbing the coating surface of a coated specimen by hand. A ranking of 1 represents the coating with the lowest tack, while rating of 4 represents the coating with the highest tack.

Formaldehyde Content

Free formaldehyde content and total formaldehyde content are measured by gas chromatography-mass spectrometry (GC-MS). Samples are heated to a temperature of 150° C. for a period of 4 minutes (free formaldehyde) or 30 minutes (total formaldehyde). Using headspace sampling, an Agilent 7890B GC equipped with a 5977A mass selective detector (MSD) and a 7697A HS is used to determine the formaldehyde content of the sample. The conditions are provided in Table A below. For free formaldehyde testing, the gas above a liquid sample is tested. For total formaldehyde testing, the gas above a liquid sample is purged, and the liquid sample is tested.

TABLE A

| Column: | Headspace: | MSD: |
|---|---|---|
| Agilent DB-WAX UI, 30 m × 0.25 mm × 0.5 μm | Oven Temperature: 130° C. | SIM: 30 m/z |
| | Loop Temperature: 150° C. | Transfer Line Temperature: 240° C. |
| Constant Flow at 1.0 mL/min | Transfer Line Temperature: 170° C. | Source Temperature: 230° C. |
| Carrier gas: Helium | Vial Equilibration Time: 30 min | Quadrupole Temperature: 150° C. |
| Inlet: | Injection Duration: 0.2 min | Retention Times: |
| Temperature: 180° C. | Cycle Time: 50 min | Formaldehyde: 2.8 min |
| Split ratio: 20:1 | Fill Pressure: 15 psi | ACCESSION #: 2018000077 |
| Oven Program: Hold at 37° C. for 5 minutes, then ran ramp at 20° C./min to 220° C. | | |

Nash formaldehyde content is measured in accordance with ASTM D5910-05. Samples are tested using formaldehyde Nash reagent post column derivatization, which derivatives formaldehyde after chromatographic separation using acetyl acetone. The derivative reaction takes place in a reaction loop at 95° C., just before the detector. Separation on a C-18 AQ or end-capped column, is detected at UV 210 nm. The sensitivity (LOD) is 0.2 ppm and the quantitation (LOQ) is 0.5 ppm.

Tensile Force

Dry tensile force, wet tensile force, and isopropyl alcohol (IPA) tensile force each is measured with an INSTRON tensile testing instrument. Test strips are pulled at a rate of 12 inches per minute (in/min).

A substrate is provided that is a piece of WHATMAN™ Grade 4 cellulose filter paper (available from Whatman Ltd.) that is 28 cm×46 cm. The substrate is (i) immersed in 300 mL of the aqueous composition for a period of from greater than 0.1 seconds to less than 1 minute, (ii) removed from the aqueous composition, (iii) padded by a Mathis' padder, and (iv) dried and crosslinked in an oven at a temperature of 150° C. for 3 minutes to form a crosslinked article. The add-on of the polymer particles is controlled to be 25 wt % of the total crosslinked article.

The crosslinked article is cut into 1 inch×4 inch test strips, wherein the 4-inch direction is the cross-machine direction (CD) of the test strip.

The tensile force of the test strips is measured on an INSTRON tensile testing instrument. Test strips are pulled at a rate of 12 in/min under three conditions: dry, wet, and IPA. The "dry" condition is measured on a test strip that has not been treated post-cutting. A "wet" condition is measured immediately after a test strip is immersed for 30 minutes in a solution containing 0.1 wt % TRITON™ X-100 (octylphenol ethoxylate, a surfactant available from The Dow Chemical Company). The wet tensile force indicates the resistance of a crosslinked article to water. An "IPA" condition is measured immediately after a test strip is immersed for 30 minutes in isopropyl alcohol (IPA). The IPA tensile force indicates the resistance of a crosslinked article to IPA.

Tensile force is measured in gram per inch (g/in).

Tensile Force Retention

Wet tensile retention is calculated in accordance with Equation (A):

$$\text{Wet Tensile Retention}(\%) = \frac{\text{wet tensile force}}{\text{dry tensile force}} \times 100. \quad \text{Equation (A)}$$

IPA tensile retention is calculated in accordance with Equation (B):

$$IPA\ \text{Tensile Retention}(\%) = \frac{IPA\ \text{tensile force}}{\text{dry tensile force}} \times 100. \quad \text{Equation (B)}$$

DETAILED DESCRIPTION

The present disclosure provides an aqueous composition. The aqueous composition includes multi-stage latex polymer particles. The multi-stage latex polymer particles include (A) a first-stage polymer containing (i) an n-methylol functional monomer and (ii) a first vinyl monomer; and (B) a second-stage polymer containing (i) a formaldehyde-scavenging monomer and (ii) a second vinyl monomer. The first-stage polymer is bound to the second-stage polymer.

The present disclosure provides another aqueous composition. The aqueous composition includes multi-stage latex polymer particles. The multi-stage latex polymer particles include (A) a first-stage polymer containing (i) n-methylol acrylamide and (ii) a first vinyl monomer; and (B) a second-stage polymer containing (i) n-(2-methacryloyloxyethylene) ethylene urea and (ii) a second vinyl monomer. The first-stage polymer is bound to the second-stage polymer.

A "multi-stage latex polymer particle" ("MSLPP") is a latex polymer in which the particles each includes a first-stage polymer and a second-stage polymer, with the first-stage polymer bound to the second-stage polymer. As used herein with respect to the MSLPP, the term "bound to" refers to a first-stage polymer and a second-stage polymer that are covalently bonded to each other, or are associated with each other in a core-shell structure with the first-stage polymer forming the core and the second-stage polymer forming the shell. The MSLPP is prepared in two or more polymerization stages. In one of the stages, an emulsion polymerization process is conducted to produce first-stage polymer particles. In a subsequent stage, an emulsion polymerization process is conducted in the presence of the first-stage polymer particles to form the second-stage polymer. In an embodiment, there is a period of time between the formation of the first-stage polymer and the formation of the second-stage polymer in which no detectable polymerization takes place. In the formation of the second-stage polymer, half or more of the second-stage polymer (by weight, based on the weight of the second-stage polymer) forms on the surfaces of the first-stage polymer particles, and the second-stage polymer binds to the first-stage polymer. The second-stage polymer encapsulates, or substantially encapsulates, the first-stage polymer particles. One or more additional polymerization stages are optionally conducted (i) before the formation of the first-stage polymer; and/or (ii) between the formation of the first-stage polymer and the second-stage polymer; and/or (iii) after the formation of the second-stage polymer; and/or (iv) a combination thereof.

A. First-Stage Polymer

The present multi-stage latex polymer particles include (A) a first-stage polymer containing (i) an n-methylol functional monomer and (ii) a first vinyl monomer.

In an embodiment, multi-stage latex polymer particles include (A) a first-stage polymer containing (i) n-methylol acrylamide (MOA) and (ii) a first vinyl monomer.

The first-stage polymer includes an n-methylol functional monomer. An "n-methylol functional monomer" is a compound containing an n-methylol substituent group. Nonlimiting examples of suitable n-methylol functional monomer include n-methylol acrylamide (MOA), n-methylol methacrylamide, n-methylol maleimide, n-metholol maleinamic acid, n-methylol maleinamic acid esters, n-methylol amides of vinyl aromatic esters such as n-methylol p-vinylbenzamide, and combinations thereof. In an embodiment, the n-methylol functional monomer is MOA.

In an embodiment, the first-stage polymer includes n-methylol acrylamide (MOA) monomer. N-methylol acrylamide (MOA) has the following Structure (1):

Sttructure (1)

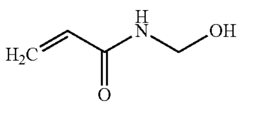

The first-stage polymer includes a first vinyl monomer.

A "vinyl monomer" is a compound having the following Structure (2):

Structure (2)

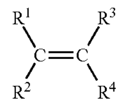

wherein $R^1$, $R^2$, $R^3$, and $R^4$ each is independently selected from hydrogen, a halogen, a hydrocarbyl, a substituted hydrocarbyl, an acrylic monomer, and combinations thereof.

Nonlimiting examples of suitable vinyl monomers include styrene (STY), α-methyl styrene, ethylene, ethylene esters, dienes, vinyl acetate, vinyl neodecanoate, acrylonitrile (AN), (meth) acrylonitriles, meth(acrylic) acids, acrylic acids, (meth) alkyl acrylates, methacrylamides, acrylamides, butyl acrylate (BA), ethyl acrylate (EA), methyl methacrylate (MMA), allylmethacrylate (ALMA), (meth) hydroxyalkyl acrylates, divinylbenzene (DVB), 2-ethyl hexyl acrylate (EHA), and combinations thereof.

In an embodiment, the first vinyl monomer is selected from acrylonitrile (AN), butyl acrylate (BA), ethyl acrylate (EA), methyl methacrylate (MMA), allylmethacrylate (ALMA), styrene (STY), divinylbenzene (DVB), and combinations thereof.

In an embodiment, the first-stage polymer contains, consists essentially of, or consists of: (i) MOA; and (ii) a first vinyl monomer selected from AN, BA, EA, MMA, ALMA, STY, DVB, and combinations thereof.

In an embodiment, the first-stage polymer contains from 1.0 wt %, or 1.5 wt %, or 2.0 wt %, or 2.5 wt %, or 2.7 wt %, or 3.0 wt % to 5.2 wt %, or 5.5 wt %, or 6.0 wt %, or 7.0 wt %, or 8.0 wt %, or 9.0 wt %, or 10.0 wt % polymerized units of n-methylol functional monomer (such as MOA), based on the dry weight of the first-stage polymer.

In an embodiment, the first-stage polymer contains (i) from 1 wt %, or 2 wt %, or 3 wt % to 6 wt %, or 7 wt %, or 8 wt %, or 9 wt %, or 10 wt % n-methylol functional monomer (such as MOA); and (ii) a reciprocal amount of the first vinyl monomer, or from 90 wt %, or 91 wt %, or 92 wt %, or 93 wt %, or 94 wt % to 97 wt %, or 98 wt %, or 99 wt % first vinyl monomer, based on the dry weight of the first-stage polymer.

In an embodiment, the first-stage polymer contains, consists essentially of, or consists of MOA, EA, and BA. In a further embodiment, the first-stage polymer includes, based on the dry weight of the first-stage polymer: (i) from 1.0 wt %, or 1.5 wt %, or 2.0 wt %, or 2.5 wt %, or 2.7 wt % to 3.0 wt %, or 3.5 wt %, or 4.0 wt %, or 5.0 wt % MOA; (ii) from 30 wt %, or 35 wt %, or 40 wt %, or 45 wt %, or 48 wt % to 49 wt %, or 50 wt %, or 55 wt %, or 60 wt %, or 65 wt %, or 69 wt % EA; and (iii) from 30 wt %, or 35 wt %, or 40 wt %, or 45 wt %, or 48 wt % to 49 wt %, or 50 wt %, or 55 wt %, or 60 wt %, or 65 wt %, or 69 wt % BA.

In an embodiment, the first-stage polymer consists essentially of, or consists of MOA, BA, and STY. In a further embodiment, the first-stage polymer includes, based on the dry weight of the first-stage polymer: (i) from 1.0 wt %, or 1.5 wt %, or 2.0 wt %, or 2.5 wt %, 3.0 wt %, or 3.5 wt %, or 4.0 wt %, or 5.0 wt %, or 5.1 wt % to 5.2 wt %, or 5.5 wt %, or 6.0 wt %, or 6.5 wt %, or 7.0 wt % MOA; (ii) from 30 wt %, or 35 wt %, or 40 wt %, or 45 wt %, or 48 wt % to 49 wt %, or 50 wt %, or 55 wt %, or 60 wt %, or 65 wt %, or 69 wt % BA; and (iii) from 30 wt %, or 35 wt %, or 40 wt %, or 45 wt %, or 46 wt % to 47 wt %, or 50 wt %, or 55 wt %, or 60 wt %, or 65 wt %, or 69 wt % STY.

In an embodiment, the first-stage polymer consists essentially of, or consists of MOA, EA, and MMA. In a further embodiment, the first-stage polymer includes, based on the dry weight of the first-stage polymer: (i) from 1.0 wt %, or 1.5 wt %, or 2.0 wt %, or 2.5 wt %, or 3.0 wt % to 3.5 wt %, or 4.0 wt %, or 5.0 wt %, or 6.0 wt % MOA; (ii) from 30 wt %, or 35 wt %, or 40 wt %, or 45 wt %, or 48 wt % to 49 wt %, or 50 wt %, or 55 wt %, or 60 wt %, or 65 wt %, or 69 wt % EA; and (iii) from 30 wt %, or 35 wt %, or 40 wt %, or 45 wt %, or 48 wt % to 49 wt %, or 50 wt %, or 55 wt %, or 60 wt %, or 65 wt %, or 69 wt % MMA.

In an embodiment, the first-stage polymer consists essentially of, or consists of MOA, BA, and ALMA. In a further embodiment, the first-stage polymer includes, based on the dry weight of the first-stage polymer: (i) from 1.0 wt %, or 1.5 wt %, or 2.0 wt % to 2.6 wt %, or 3.0 wt %, or 3.5 wt %, or 4.0 wt % MOA; (ii) from 70 wt %, or 75 wt %, or 80 wt %, or 85 wt %, or 90 wt %, or 94 wt % to 95 wt %, or 96 wt %, or 97 wt %, or 98 wt % BA; and (iii) from 1 wt %, or 2 wt %, or 3 wt %, or 4 wt % to 5 wt %, or 6 wt %, or 7 wt %, or 10 wt %, or 15 wt %, or 20 wt %, or 25 wt %, or 29 wt % ALMA.

The aggregate of components (i)-(iii) amount to 100 wt % of the first-stage polymer.

In an embodiment, the first-stage polymer is void of, or substantially void of, formaldehyde-scavenging monomer.

In an embodiment, the first-stage polymer is void of, or substantially void of, MAEEU.

The first-stage polymer may comprise two or more embodiments disclosed herein.

B. Second-Stage Polymer

The present multi-stage latex polymer particles include (B) a second-stage polymer containing (i) a formaldehyde-scavenging monomer and (ii) a second vinyl monomer.

In an embodiment, the multi-stage latex polymer particles include (B) a second-stage polymer containing (i) n-(2-methacryloyloxyethylene) ethylene urea (MAEEU) and (ii) a second vinyl monomer.

The second-stage polymer includes a formaldehyde-scavenging monomer. A "formaldehyde-scavenging monomer" is a compound containing a urea group. Nonlimiting examples of suitable formaldehyde-scavenging monomers include n-(2-methacryloyloxyethylene) ethylene urea (MAEEU), n-hydroxyethylene urea, n-aminoethylene urea, n-(3-allyloxy-2-hydroxypropyl)aminoethylene urea, n-acryloxyethylene urea, n-methacrylaminoethylene urea, n-acrylaminoethylene urea, n-methacryloxyacetoxyethylene urea, n-methacryloxyacetaminoethylene urea, and n-di(3-allyloxy-2-hydroxypropyl)aminoethylethylene urea. In an embodiment, the formaldehyde-scavenging monomer is n-(2-methacryloyloxyethylene) ethylene urea (MAEEU).

In an embodiment, the second-stage polymer includes n-(2-methacryloyloxyethylene) ethylene urea (MAEEU) monomer. MAEEU has the following Structure (3):

Structure (3)

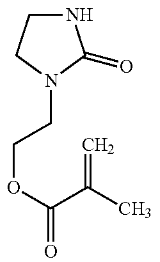

The second-stage polymer includes a second vinyl monomer.

The second vinyl monomer may be any vinyl monomer disclosed herein.

The second vinyl monomer may be the same as or different than the first vinyl monomer in the first-stage polymer. In an embodiment, the second vinyl monomer of the second-stage polymer is the same as the first vinyl monomer of the first-stage polymer. When the second vinyl monomer of the second-stage polymer is the same as the first vinyl monomer of the first-stage polymer, the second vinyl monomer and the first vinyl monomer include an identical vinyl monomer, or an identical blend of vinyl monomers in an identical weight ratio. In another embodiment, the second vinyl monomer of the second-stage polymer is different than the first vinyl monomer of the first-stage polymer.

In an embodiment, the second-stage polymer contains, consists essentially of, or consists of polymerized units derived from (i) MAEEU and (ii) the second vinyl monomer selected from AN, BA, EA, MMA, ALMA, STY, DVB, and combinations thereof.

In an embodiment, the second-stage polymer contains from 1.0 wt %, or 1.5 wt %, or 2.0 wt %, or 2.5 wt %, or 3.0 wt %, or 4.0 wt % to 5.0 wt %, or 6.0 wt %, or 8.0 wt %, or 9.0 wt %, or 10.0 wt %, or 11.0 wt %, or 12.0 wt %, or 13.0 wt %, or 14.0 wt %, or 15.0 wt % polymerized units of formaldehyde-scavenging monomer (such as MAEEU), based on the dry weight of the second-stage polymer.

In an embodiment, the second-stage polymer contains (i) from 1 wt %, or 2 wt %, or 3 wt %, or 4 wt % to 5 wt %, or 6 wt %, or 7 wt %, or 8 wt %, or 9 wt %, or 10 wt %, or 11 wt %, or 12 wt %, or 13 wt %, or 14 wt %, or 15 wt % formaldehyde-scavenging monomer (such as MAEEU); and (ii) a reciprocal amount of the second vinyl monomer, or from 85 wt %, or 86 wt %, or 87 wt %, or 88 wt %, or 89 wt %, or 90 wt %, or 91 wt %, or 92 wt %, or 93 wt %, or 94 wt %, or 95 wt % to 96 wt %, or 97 wt %, or 98 wt %, or 99 wt % second vinyl monomer, based on the dry weight of the second-stage polymer.

In an embodiment, the second-stage polymer contains, consists essentially of, or consists of MAEEU, EA, and BA. In a further embodiment, the second-stage polymer includes, based on the dry weight of the second-stage polymer: (i) from 1.0 wt %, or 2.0 wt %, or 2.5 wt %, or 3.0 wt %, or 3.5 wt %, or 4.0 wt % to 4.3 wt %, or 4.5 wt %, or 5.0 wt %, or 5.5 wt %, or 6.0 wt %, or 7.0 wt %, or 10.0 wt % MAEEU; (ii) rom 30 wt %, or 35 wt %, or 40 wt %, or 45 wt %, or 47 wt % to 48 wt %, or 50 wt %, or 55 wt %, or 60 wt %, or 65 wt %, or 69 wt % EA; and (iii) from 30 wt %, or 35 wt %, or 40 wt %, or 45 wt %, or 47 wt % to 48 wt %, or 50 wt %, or 55 wt %, or 60 wt %, or 65 wt %, or 69 wt % BA.

In an embodiment, the second-stage polymer contains, consists essentially of, or consists of MAEEU, BA, and STY. In a further embodiment, the second-stage polymer includes, based on the dry weight of the second-stage polymer: (i) from 3.0 wt %, or 3.5 wt %, or 4.0 wt %, or 4.5 wt %, or 5.0 wt %, or 5.5 wt %, or 6.0 wt %, or 6.5 wt % to 7.0 wt %, or 7.5 wt %, or 8.0 wt %, or 8.5 wt %, or 9.0 wt %, or 10.0 wt %, or 11.0 wt % MAEEU; (ii) from 30 wt %, or 35 wt %, or 40 wt %, or 45 wt %, or 50 wt % to 51 wt %, or 55 wt %, or 60 wt %, or 65 wt %, or 67 wt % BA; and (iii) from 30 wt %, or 35 wt %, or 40 wt %, or 45 wt %, or 47 wt % to 48 wt %, or 50 wt %, or 55 wt %, or 60 wt %, or 65 wt %, or 67 wt % STY.

In an embodiment, the second-stage polymer contains, consists essentially of, or consists of MAEEU, EA, and MMA. In a further embodiment, the second-stage polymer includes, based on the dry weight of the second-stage polymer: (i) from 1.0 wt %, or 2.0 wt %, or 2.5 wt %, or 3.0 wt %, or 3.5 wt %, or 4.0 wt %, or 4.5 wt % to 4.8 wt %, or 5.0 wt %, or 5.5 wt %, or 6.0 wt %, or 7.0 wt %, or 10.0 wt % MAEEU; (ii) from 30 wt %, or 35 wt %, or 40 wt %, or 45 wt %, or 48 wt % to 49 wt %, or 50 wt %, or 55 wt %, or 60 wt %, or 65 wt %, or 69 wt % EA; and (iii) from 30 wt %, or 35 wt %, or 40 wt %, or 45 wt %, or 47 wt % to 48 wt %, or 50 wt %, or 55 wt %, or 60 wt %, or 65 wt %, or 69 wt % MMA.

In an embodiment, the second-stage polymer contains, consists essentially of, or consists of MAEEU, MMA, and EA. In a further embodiment, the second-stage polymer includes, based on the dry weight of the second-stage polymer: (i) from 5.0 wt %, or 6.0 wt %, or 7.0 wt %, or 8.0 wt %, or 9.0 wt %, or 9.5 wt %, or 10.0 wt % to 10.5 wt %, or 11.0 wt %, or 11.5 wt %, or 12.0 wt %, or 13.0 wt %, or 14.0 wt %, or 15.0 wt % MAEEU; (ii) from 60 wt %, or 65 wt %, or 70 wt %, or 75 wt %, or 80 wt %, or 86 wt % to 90 wt %, or 91 wt %, or 92 wt %, or 93 wt %, or 94 wt % MMA; and (iii) from 1 wt %, or 2 wt %, or 3 wt %, or 4 wt % to 5 wt %, or 6 wt %, or 7 wt %, or 10 wt %, or 15 wt %, or 20 wt %, or 25 wt %, or 29 wt % EA.

The aggregate of components (i)-(iii) amount to 100 wt % of the second-stage polymer.

In an embodiment, the second-stage polymer is void of, or substantially void of, n-methylol functional monomer.

In an embodiment, the second-stage polymer is void of, or substantially void of, MOA.

The second-stage polymer may comprise two or more embodiments disclosed herein.

The first-stage polymer is bound to the second-stage polymer. In an embodiment, the first-stage polymer is bound to the second-stage polymer by a crosslinking reaction between at least one monomer in the first-stage polymer and at least one monomer in the second-stage polymer. A non-limiting example of a crosslinking monomer that forms a bond between the first-stage polymer and the second-stage polymer is a vinyl monomer with at least two vinyl groups. A "vinyl group" is a moiety having the following Structure (4):

Structure (4)

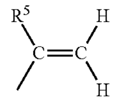

wherein $R^5$ is selected from hydrogen and a $C_1$-$C_8$ hydrocarbyl.

In an embodiment, at least one of the first-stage polymer and the second-stage polymer includes a vinyl monomer with at least two vinyl groups. Nonlimiting examples of suitable vinyl monomers with at least two vinyl groups include ALMA, DVB, and combinations thereof.

In an embodiment, the MSLPP includes from 40 wt %, or 45 wt %, or 50 wt %, or 55 wt %, or 60 wt %, or 65 wt %, or 70 wt %, or 75 wt %, or 80 wt % to 85 wt %, or 90 wt %, or 95 wt % of the first-stage polymer, based on the total dry weight of the MSLPP.

In an embodiment, the MSLPP includes from 5 wt %, or 10 wt %, or 15 wt % to 20 wt %, or 25 wt %, or 30 wt %, or 35 wt %, or 40 wt %, or 45 wt %, or 50 wt %, or 55 wt %, or 60 wt % of the second-stage polymer, based on the total dry weight of the MSLPP.

In an embodiment, the weight ratio of the first-stage polymer to the second-stage polymer in the MSLPP is from 0.6:1, or 0.8:1, or 1:1, or 1.2:1, or 1.5:1, or 1.8:1, or 2.3:1, or 3:1, or 4:1, or 5.7:1, or 9:1, or 19:1.

C. Particles

The particles for the MSLPP can be (i) binder particles, (ii) microsphere particles, or (iii) a combination of (i) binder particles and (ii) microsphere particles.

In an embodiment, the MSLPP has a $D_{50}$ particle size from 0.03 μm to 5 μm, or 20 μm.

In an embodiment, the MSLPP includes binder particles. A "binder particle" is a MSLPP having a $D_{50}$ particle size from 0.03 μm to less than 1.0 μm. In an embodiment, the binder particles have a $D_{50}$ particle size from 0.03 μm, or 0.05 μm, or 0.08 μm, or 0.10 μm, or 0.20 μm, or 0.25, or 0.29 to 0.30 μm, or 0.40 μm, or 0.45, or 0.50 μm, or 0.60 μm, or 0.70 μm, or 0.80 μm, or 0.90 μm, or less than 1.0 μm.

In an embodiment, the MSLPP includes microsphere particles. A "microsphere particle" is a MSLPP having a $D_{50}$ particle size from 1 μm to 20 μm. In an embodiment, the microsphere particles have a $D_{50}$ particle size from 1 μm, or 2 μm, or 3 μm, or 4 μm, or 5 μm to 6 μm, or 7 μm, or 8 μm, or 9 μm, or 10 μm, or 13 μm, or 15 μm, or 18 μm, or 19 μm, or 20 μm.

Nonlimiting examples of suitable methods to control the particle size of the MSLPP include surfactant selection, controlling the concentration of surfactant, seed growth, and combinations thereof. Microsphere particles and binder particles may be prepared as described in U.S. Pat. No. 7,829,626 (referring to the duller particles and the binder component, respectively), the entire contents of which are incorporated herein by reference.

In an embodiment, the MSLPP is formed to the desired particle size using surfactant selection. Nonlimiting examples of suitable surfactants include alkali metal or ammonium salts of alkyl, aryl, or alkylaryl sulfates; alkali metal or ammonium salts of sulfonates or phosphates; alkyl sulfonic acids; sulfosuccinate salts; fatty acids; ethylenically unsaturated surfactant monomers; ethoxylated alcohols or phenols; and combinations thereof. In an embodiment, the surfactant is sodium sulfate, sodium laurel sulfate, or a combination thereof.

In an embodiment, the MSLPP is formed to the desired particle size by controlling the surfactant concentration. In an embodiment, the concentration of surfactant in the aqueous emulsion polymerization, during formation of the first-stage polymer and/or the second-stage polymer, is from greater than 0 wt %, or 0.1 wt % to 6 wt %, based on the total weight of the monomers.

In an embodiment, the MSLPP is formed to the desired particle size using seed growth. During seed growth, a seed particle (either a copolymer seed particle or an oligomer seed particle) is included in the emulsion polymerization process conducted to produce the first-stage polymer. In an embodiment, there is a period of time between the formation of the seed particle and the formation of the first-stage polymer in which no detectable polymerization takes place. In the formation of the first-stage polymer, half or more of the first-stage polymer (by weight, based on the weight of the first-stage polymer) forms on the surfaces of the seed particles. The first-stage polymer encapsulates, or substantially encapsulates, the seed particles. Seed particles may be prepared as described in U.S. Pat. No. 8,686,096 (e.g., Examples 1 and 5 (col. 19 and 20)) and U.S. Pat. No. 7,829,626, the entire contents of which are incorporated herein by reference. In an embodiment, the seed particle is an oligomer seed particle containing an acrylic monomer. In a further embodiment, the seed particle is an acrylic oligomer seed (AOS) particle containing butyl acrylate, n-dodecyl mercaptan, methyl methacrylate (MMA), and methacrylic acid (MAA). In an embodiment, the seed particle has a $D_{50}$ particle size from 0.03 μm, or 0.1 μm, or 0.5 μm, or 0.8 μm to 1.0 μm, or 2.0 μm, or 5.0 μm, or 10.0 μm, or 15.0 μm, or less than 20.0 μm.

The present MSLPP with (A) a first-stage polymer and (B) a second-stage polymer excludes single-phase polymers, such as polymers prepared in a single polymerization step. Instead, the present MSLPP is structurally distinct from traditional single-phase polymers because the present MSLPP includes two distinct polymers with different monomers (the (A) first-stage polymer containing MOA and a first vinyl monomer, and the (B) second-stage polymer containing MAEEU and a second vinyl monomer) bound together, while traditional single-phase polymers include a single polymer with the same monomers distributed throughout the entire polymer chain.

The MSLPP may comprise two or more embodiments disclosed herein.

D. Aqueous Composition

The present aqueous composition incudes MSLPP. The MSLPP may be any MSLPP disclosed herein.

In an embodiment, the aqueous composition contains one or more optional additives.

Nonlimiting examples of suitable additives include wetting agents, rheology modifiers (such as ACRYSOL™ ASE-60, a thickening agent, available from The Dow Chemical Company), antiblocking agents, defoamers, atomizing aids, bases (such as aqueous ammonia hydroxide), pigments, dyes, and combinations thereof. In an embodiment, the aqueous composition contains from greater than 0 wt %, or 0.1 wt %, or 0.5 wt % to 1 wt %, or 5 wt %, or 10 wt % optional additive, based on the total weight of the aqueous composition.

In an embodiment, the aqueous composition has a solids content from 1 wt %, or 5 wt %, or 10 wt %, or 15 wt %, or 20 wt %, or 25 wt % to 30 wt %, or 35 wt %, or 40 wt %, or 45 wt %, or 50 wt %, or 55 wt %, or 60 wt %, or 70 wt %, or 80 wt %, based on the total weight of the aqueous composition.

In an embodiment, the aqueous composition contains from 1 wt %, or 5 wt %, or 10 wt %, or 15 wt %, or 20 wt %, or 25 wt % to 30 wt %, or 35 wt %, or 40 wt %, or 45 wt %, or 50 wt %, or 55 wt %, or 60 wt %, or 65 wt %, or 70 wt %, or 80 wt % MSLPP, based on the total weight of the aqueous composition.

In an embodiment, the aqueous composition contains from 1 wt %, or 5 wt %, or 7 wt %, or 10 wt %, or 15 wt %, 19 wt %, or 20 wt %, or 21 wt %, or 25 wt % to 26 wt %, or 30 wt %, or 35 wt %, or 40 wt % binder particles, based on the total weight of the aqueous composition. In another embodiment, the aqueous composition contains from 1 wt % to 40 wt %, or from 5 wt % to 30 wt %, or from 7 wt % to 26 wt % binder particles, based on the total weight of the aqueous composition.

In an embodiment, the aqueous composition contains from 5 wt %, or 8 wt %, or 10 wt %, or 15 wt %, or 20 wt %, or 22 wt %, or 25 wt %, or 30 wt %, or 35 wt %, or 40 wt %, or 44 wt % to 45 wt %, or 50 wt %, or 55 wt %, or 60 wt %, or 65 wt %, or 70 wt %, or 80 wt % microsphere particles, based on the total weight of the aqueous composition. In another embodiment, the aqueous composition contains from 5 wt % to 80 wt %, or from 5 wt % to 50 wt %, or from 8 wt % to 45 wt % microsphere particles, based on the total weight of the aqueous composition.

In an embodiment, the aqueous composition contains, based on the total weight of the aqueous composition: (i) from 1 wt %, or 5 wt %, or 7 wt % to 20 wt %, or 25 wt %, or 30 wt % binder particles; and (ii) from 5 wt %, or 6 wt %, or 8 wt % to 23 wt %, or 25 wt %, or 30 wt %, or 35 wt % microsphere particles.

In an embodiment, the aqueous composition has a free formaldehyde (HCHO) content of less than 30 ppm. In a further embodiment, the aqueous composition has a free HCHO content from 0 ppm to 12 ppm, or 13 pm, or 18 ppm, or 20 ppm, or 25 ppm, or less than 30 ppm. In a further embodiment, the aqueous composition has a free HCHO content from 0 ppm to less than 30 ppm, or from 0 ppm to less than 25 ppm, or from 0 ppm to 20 ppm, or from 0 ppm to 18 ppm. The free HCHO content indicates the initial concentration of HCHO that may be liberated when a container including the aqueous composition is opened.

In an embodiment, the aqueous composition has a total formaldehyde (HCHO) content of less than 150 ppm. In a further embodiment, the aqueous composition has a total HCHO content from 0 ppm to 92 ppm, or 95 ppm, or 114 ppm, or 115 ppm, or 143 ppm, or 145 ppm, or less than 150 ppm. In a further embodiment, the aqueous composition has a total HCHO content from 0 ppm to less than 150 ppm, or from 0 ppm to 145 ppm, or from 0 ppm to 143 ppm. The total HCHO content indicates the amount of HCHO that may be liberated during drying or a heat curing process.

In an embodiment, the aqueous composition has a Nash formaldehyde (HCHO) content of less than, or equal to, 2 ppm. In a further embodiment, the aqueous composition has a Nash HCHO content from 0 ppm to 0.8 ppm, or 0.9 ppm, or 1.0 ppm, or 1.9 ppm, or less than 2.0 ppm, or 2.0 ppm, or 6.0 ppm, or 10.0 ppm. In a further embodiment, the aqueous composition has a Nash HCHO content from 0 ppm to 10.0 ppm, or from 0 ppm to 6.0 ppm, or from 0 ppm to 2.0 ppm, or from 0 ppm to less than 2.0 ppm, or from 0 ppm to 1.9 ppm. The Nash HCHO content indicates the amount of HCHO present in a closed (i.e., un-opened) container including the aqueous composition.

In an embodiment, the aqueous composition has a 60° gloss from greater than 0%, or 0.1%, or 0.5%, or 0.6% to 8.2%, or 8.5%, or 9.0%. A gloss of 9% or less is advantageous in article applications that require reduced reflection of light from the article's surface. Low gloss (i.e., less than 9%) also provides a coating surface with a uniform appearance.

In an embodiment, the aqueous composition has an 85° gloss from greater than 0%, or 1%, or 5%, or 7% to 8%, or 10%, or 15%, or 20%, or 50%, or 70%, or 80%.

In an embodiment, the aqueous composition has a tack rating from 1 to 2.

In an embodiment, the aqueous composition is stable. Stability is determined by measuring viscosity before and after storage. If the ratio of the viscosity after storage to the viscosity before storage remains in the range of from 0.5:1 to 2:1, the aqueous composition is considered stable. Viscosity is measured at 25° C., with a Brookfield LV viscometer, spindle #2, at 60 rpm. Storage is conducted at 50° C. for 7 days.

In an embodiment, the aqueous composition has one, some, or all, of the following properties: (i) a free HCHO content from 0 ppm to 12 ppm, or 13 pm, or 18 ppm, or 20 ppm, or 25 ppm, or less than 30 ppm; and/or (ii) a total HCHO content from 0 ppm to 92 ppm, or 95 ppm, or 114 ppm, or 115 ppm, or 143 ppm, or 145 ppm, or less than 150 ppm; and/or (iii) a Nash HCHO content from 0 ppm to 0.8 ppm, or 0.9 ppm, or 1.0 ppm, or 1.9 ppm, or less than 2.0 ppm, or 2.0 ppm, or 6.0 ppm, or 10.0 ppm; and/or (iv) a 60° gloss from greater than 0%, or 0.1%, or 0.5%, or 0.6% to 8.2%, or 8.5%, or 9.0%; and/or (v) an 85° gloss from greater than 0%, or 1%, or 5%, or 7% to 8%, or 10%, or 15%, or 20%; and/or (vi) a tack rating from 1 to 2; and/or (vii) the aqueous composition is stable.

In an embodiment, the aqueous composition contains, consists essentially of, or consists of MSLPP containing, consisting essentially of, or consisting of:

(A) from 40 wt %, or 45 wt %, or 50 wt %, or 55 wt %, or 60 wt %, or 65 wt %, or 70 wt %, or 75 wt %, or 80 wt % to 85 wt %, or 90 wt %, or 95 wt % first-stage polymer, based on the total weight of the MSLPP, the first-stage polymer containing (i) from 1 wt %, or 2 wt %, or 3 wt % to 6 wt %, or 7 wt %, or 8 wt %, or 9 wt %, or 10 wt % polymerized units of MOA, based on the dry weight of the first-stage polymer; and (ii) from 90 wt %, or 91 wt %, or 92 wt %, or 93 wt %, or 94 wt % to 97 wt %, or 98 wt %, or 99 wt % polymerized units of a first vinyl monomer, based on the dry weight of the first-stage polymer;

(B) from 5 wt %, or 10 wt %, or 15 wt % to 20 wt %, or 25 wt %, or 30 wt %, or 35 wt %, or 40 wt %, or 45 wt %, or 50 wt %, or 55 wt %, or 60 wt % second-stage polymer, based on the total weight of the MSLPP, the second-stage polymer containing (i) from 1 wt %, or 2 wt %, or 3 wt %, or 4 wt % to 5 wt %, or 6 wt %, or 7 wt %, or 8 wt %, or 9 wt %, or 10 wt %, or 11 wt %, or 12 wt %, or 13 wt %, or 14 wt %, or 15 wt % polymerized units of MAEEU, based on the dry weight of the second-stage polymer; and (ii) from 85 wt %, or 86 wt %, or 87 wt %, or 88 wt %, or 89 wt %, or 90 wt %, or 91 wt %, or 92 wt %, or 93 wt %, or 94 wt %, or 95 wt % to 96 wt %, or 97 wt %, or 98 wt %, or 99 wt % polymerized units of a second vinyl monomer, based on the dry weight of the second-stage polymer;

the first-stage polymer is bound to the second-stage polymer; and the MSLPP has one, some, or all, of the following properties: (1) the first-stage polymer is void of, or substantially void of, MAEEU; and/or (2) the second-stage polymer is void of, or substantially void of, MOA; and/or (3) the weight ratio of the first-stage polymer to the second-stage polymer in the MSLPP is from 0.6:1, or 0.8:1, or 1:1, or 1.2:1, or 1.5:1, or 1.8:1, or 2.3:1, or 3:1, or 4:1, or 5.7:1, or 9:1, or 19:1; and/or (4) the MSLPP has a $D_{50}$ particle size from 0.03 μm to 5 μm, or 20 μm; and/or (5) the MSLPP includes binder particles with a $D_{50}$ particle size from 0.03 μm, or 0.05 μm, or 0.08 μm, or 0.10 μm, or 0.20 μm, or 0.25, or 0.29 to 0.30 μm, or 0.40 μm, or 0.45, or 0.50 μm, or 0.60 μm, or 0.70 μm, or 0.80 μm, or 0.90 μm, or less than 1.0 μm; and/or (6) the MSLPP includes microsphere particles with a $D_{50}$ particle size from 1 μm, or 2 μm, or 3 μm, or 4 μm, or 5 μm to 6 μm, or 7 μm, or 9 μm, or 10 μm, or 15 μm, or 18 μm, or 19 μm, or 20 μm; and the aqueous composition has one, some, or all, of the following properties: (1) the aqueous composition contains from 1 wt %, or 5 wt %, or 7 wt %, or 10 wt %, or 15 wt %, 19 wt %, or 20 wt %, or 21 wt %, or 25 wt % to 26 wt %, or 30 wt %, or 35 wt %, or 40 wt % binder particles, based on the total weight of the aqueous composition; and/or (2) the aqueous composition contains from 5 wt %, or 8 wt %, or 10 wt %, or 15 wt %, or 20 wt %, or 22 wt %, or 25 wt %, or 30 wt %, or 35 wt %, or 40 wt %, or 44 wt % to 45 wt %, or 50 wt %, or 55 wt %, or 60 wt %, or 65 wt %, or 70 wt %, or 80 wt % microsphere particles, based on the total weight of the aqueous composition; and/or (3) a free HCHO content from 0 ppm to 12 ppm, or 13 pm, or 18 ppm, or 20 ppm, or 25 ppm, or less than 30 ppm; and/or (4) a total HCHO content from 0 ppm to 92 ppm, or 95 ppm, or 114 ppm, or 115 ppm, or 143 ppm, or 145 ppm, or less than 150 ppm; and/or (5) a Nash HCHO content from 0 ppm to 0.8 ppm, or 0.9 ppm, or 1.0 ppm, or 1.9 ppm, or less than 2.0 ppm, or 2.0 ppm, or 6.0 ppm, or 10.0 ppm; and/or (6) a 60° gloss from greater than 0%, or 0.1%, or 0.5%, or 0.6% to 8.2%, or 8.5%, or 9.0%; and/or (7) an 85° gloss from greater than 0%, or 1%, or 5%, or 7% to 8%, or 10%, or 15%, or 20%; and/or (8) a tack rating from 1 to 2; and/or (9) the aqueous composition is stable.

It is understood that the sum of the components in each of the MSLPP disclosed herein, including the foregoing MSLPP, yields 100 wt %.

It is understood that the sum of the components in each of the aqueous compositions disclosed herein, including the foregoing aqueous composition, yields 100 wt %.

Not wishing to be bound by any particular theory, it is believed that the presence of the MOA in the first-stage polymer provides the present aqueous composition with the ability to self-crosslink. However, formaldehyde is a by-product of the emulsion polymerization of MOA. The presence of formaldehyde in aqueous compositions, as well as in articles including a component formed from the aqueous composition, is undesirable for both the manufacturers of the aqueous compositions and articles, as well as the end use consumer.

Another composition is provided containing MSLPP in which the composition of the first-stage polymer and the second-stage polymer each is switched, such that MSLPP includes (A') a first-stage polymer containing (i) the formaldehyde-scavenging monomer and (ii) the second vinyl monomer and (B') a second-stage polymer containing (i) the n-methylol functional monomer and (ii) the first vinyl monomer. The (A') first stage polymer is bound to the (B') second-stage polymer. The formaldehyde-scavenging monomer and the n-methylol-functional monomer each is in a different stage polymer of the MSLPP.

The aqueous composition may comprise two or more embodiments disclosed herein.

E. Article

In an embodiment, an article can be prepared that includes a substrate and the above-described aqueous composition. The substrate is in contact with the aqueous composition.

Nonlimiting examples of suitable substrates include a nonwoven textile, paper, plastic, leather, plaster, plaster board, glass, metal, and combinations thereof.

In an embodiment, the article includes a nonwoven textile. A nonlimiting example of a nonwoven textile is a knitted textile. Nonlimiting examples of artificial fibers include polyesters, polyamides, acrylics, polyolefins, polyvinyl chlorides, polyvinylidene chlorides, polyvinyl alcohols, and combinations thereof. Nonlimiting examples of suitable natural fibers include wool, cellulosic, and combinations thereof. Nonlimiting examples of cellulosic fibers include cotton, hemp, and combinations thereof. In an embodiment, the fibers are selected from artificial fibers, cellulosic fibers, and combinations thereof.

In an embodiment, the article includes a nonwoven textile, and a coating on the textile. The coating includes a composition including MSLPP that include (A) a first-stage polymer containing (i) MOA and (ii) a first vinyl monomer; and (B) a second-stage polymer containing (i) MAEEU and (ii) a second vinyl monomer. The first-stage polymer is bound to the second-stage polymer.

The coating is in contact with the nonwoven textile. In an embodiment, the coating is distributed throughout, or substantially throughout the textile such that the coating contacts the fibers throughout the thickness of the nonwoven textile.

In an embodiment, the coating directly contacts the nonwoven textile, or further, the fibers of the nonwoven textile. The term "directly contacts," as used herein, is a coating configuration whereby the coating is located immediately adjacent to the nonwoven textile (or further, the fibers), the coating touches the nonwoven textile (or further, the fibers), and no intervening layers, no intervening coatings, and/or no intervening structures, are present between the coating and the textile (or further, the fibers).

In another embodiment, the coating indirectly contacts the nonwoven textile, or further, the fibers of the nonwoven textile. The term "indirectly contacts," as used herein, is a coating configuration whereby an intervening layer, an intervening coating, and/or an intervening structure, is present between the coating and the textile (or further, the fibers).

In an embodiment, the article including a nonwoven textile has a dry tensile force from 6000 g/in, or 6500 g/in, or 7000 g/in, or 7100 Win to 7500 g/in, or 8000 Win, or 9000 g/in, or 10000 g/in, or 15000 g/in, or 20000 g/in.

In an embodiment, the article including a nonwoven textile has a wet tensile force from 2000 g/in, or 2100 Win to 3500 g/in, or 4000 g/in, or 5000 g/in, or 10000 Win, or 15000 g/in, or 20000 g/in.

In an embodiment, the article including a nonwoven textile has a wet tensile retention from 20%, or 25%, or 30% to 45%, or 50%, or 55%, or 60%, or 70%, or 80%, or 90%, or 95%, or 100%. In another embodiment, the article has a wet tensile retention from 20% to 100%, or from 25% to 80%, or from 30% to 80%. A wet tensile retention from 20% to 100% indicates that the coating sufficiently binds the fibers of the nonwoven textile to each other for article applications that are conventionally exposed to water, such as clothing that should be washable. Without sufficient wet tensile retention, the article will fray or break apart after being exposed to water.

In an embodiment, the article including a nonwoven textile has an isopropyl alcohol (IPA) tensile force from 2000 Win, or 2500 g/in, or 3000 Win to 4000 g/in, or 4500 g/in, or 5000 g/in, or 10000 g/in, or 20000 g/in.

In an embodiment, the article including a nonwoven textile has an IPA tensile retention from 35%, or 40%, or 43% to 50%, or 55%, or 60%, or 70%, or 80%, or 90%, or 95%, or 100%.

In an embodiment, the article including a nonwoven textile has (i) a wet tensile retention from 20%, or 25%, or 30% to 45%, or 50%, or 55%, or 60%, or 70%, or 80%, or 90%, or 95%, or 100% and (ii) an IPA tensile retention from 35%, or 40%, or 43% to 50%, or 55%, or 60%, or 70%, or 80%, or 90%, or 95%, or 100%.

In an embodiment, the article has a tack rating from 1 to 2.

In an embodiment, the article has a 60° gloss from greater than 0%, or 0.1%, or 0.5%, or 0.6% to 8.2%, or 8.5%, or 9.0%.

In an embodiment, the article has an 85° gloss from greater than 0%, or 1%, or 5%, or 7% to 8%, or 10%, or 15%, or 20%.

In an embodiment, the article includes a nonwoven textile and a coating on the textile. The coating includes a composition including MSLPP containing, consisting essentially of, or consisting of:

(A) from 40 wt %, or 45 wt %, or 50 wt %, or 55 wt %, or 60 wt %, or 65 wt %, or 70 wt %, or 75 wt %, or 80 wt % to 85 wt %, or 90 wt %, or 95 wt % first-stage polymer, based on the total weight of the particles, the first-stage polymer containing (i) from 1 wt %, or 2 wt %, or 3 wt % to 6 wt %, or 7 wt %, or 8 wt %, or 9 wt %, or 10 wt % polymerized units of MOA, based on the dry weight of the first-stage polymer; and (ii) from 90 wt %, or 91 wt %, or 92 wt %, or 93 wt %, or 94 wt % to 97 wt %, or 98 wt %, or 99 wt % polymerized units of a first vinyl monomer, based on the dry weight of the first-stage polymer;

(B) from 5 wt %, or 10 wt %, or 15 wt % to 20 wt %, or 25 wt %, or 30 wt %, or 35 wt %, or 40 wt %, or 45 wt %, or 50 wt %, or 55 wt %, or 60 wt % second-stage polymer, based on the total weight of the particles, the second-stage polymer containing (i) from 1 wt %, or 2 wt %, or 3 wt %, or 4 wt % to 5 wt %, or 6 wt %, or 7 wt %, or 8 wt %, or 9 wt %, or 10 wt %, or 11 wt %, or 12 wt %, or 13 wt %, or 14 wt %, or 15 wt % polymerized units of MAEEU, based on the dry weight of the second-stage polymer; and (ii) from 85 wt %, or 86 wt %, or 87 wt %, or 88 wt %, or 89 wt %, or 90 wt %, or 91 wt %, or 92 wt %, or 93 wt %, or 94 wt %, or 95 wt % to 96 wt %, or 97 wt %, or 98 wt %, or 99 wt % polymerized units of a second vinyl monomer, based on the dry weight of the second-stage polymer;

wherein the first-stage polymer is bound to the second-stage polymer;

the MSLPP having one, some, or all, of the following properties: (1) the first-stage polymer is void of, or substantially void of, MAEEU; and/or (2) the second-stage polymer is void of, or substantially void of, MOA; and/or (3) the weight ratio of the first-stage polymer to the second-stage polymer is from 0.6:1, or 0.8:1, or 1:1, or 1.2:1, or 1.5:1, or 1.8:1, or 2.3:1, or 3:1, or 4:1, or 5.7:1, or 9:1, or 19:1; and/or (4) the MSLPP includes binder particles having a $D_{50}$ particle size from 0.03 μm, or 0.10 μm, or 0.20 μm, or 0.25, or 0.29 to 0.30 μm, or 0.40 μm, or 0.45, or 0.50 μm, or 0.60 μm, or 0.70 μm, or 0.80 μm, or 0.90 μm, or less than 1.0 μm; and/or (5) the MSLPP includes microsphere particles having a $D_{50}$ particle size from 1 μm, or 2 μm, or 3 μm, or 4 μm, or 5 μm to 6 μm, or 7 μm, or 8 μm, or 10 μm, or 15 μm, or 20 μm;

wherein the composition is formed from an aqueous composition having one, some, or all, of the following properties: (1) the aqueous composition contains from 1 wt %, or 5 wt %, or 7 wt %, or 10 wt %, or 15 wt %, 19 wt %, or 20 wt %, or 21 wt %, or 25 wt % to 26 wt %, or 30 wt %, or 35 wt %, or 40 wt % binder particles, based on the total weight of the aqueous composition; and/or (2) the aqueous composition contains from 5 wt %, or 8 wt %, or 10 wt %, or 15 wt %, or 20 wt %, or 22 wt %, or 25 wt %, or 30 wt %, or 35 wt %, or 40 wt %, or 44 wt % to 45 wt %, or 50 wt %, or 55 wt %, or 60 wt %, or 65 wt %, or 70 wt %, or 80 wt % microsphere particles, based on the total weight of the aqueous composition; and/or (3) a free HCHO content from 0 ppm to 12 ppm, or 13 pm, or 18 ppm, or 20 ppm, or 25 ppm, or less than 30 ppm; and/or (4) a total HCHO content from 0 ppm to 92 ppm, or 95 ppm, or 114 ppm, or 115 ppm, or 143 ppm, or 145 ppm, or less than 150 ppm; and/or (5) a Nash HCHO content from 0 ppm to 0.8 ppm, or 0.9 ppm, or 1.0 ppm, or 1.9 ppm, or less than 2.0 ppm, or 2.0 ppm, or 6.0 ppm, or 10.0 ppm; and/or (6) a 60° gloss from greater than 0%, or 0.1%, or 0.5%, or 0.6% to 8.2%, or 8.5%, or 9.0%; and/or (7) an 85° gloss from greater than 0%, or 1%, or 5%, or 7% to 8%, or 10%, or 15%, or 20%; and/or (8) a tack rating from 1 to 2; and/or (9) the aqueous composition is stable; and the article has one, some, or all, of the following properties: (1) a dry tensile force from 6000 g/in, or 6500 g/in, or 7000 Win, or 7100 g/in to 7500 Win, or 8000 g/in, or 9000 Win, or 10000 g/in, or 15000 g/in, or 20000 g/in; and/or (2) a wet tensile force from 2000 g/in, or 2100 g/in to 3500 g/in, or 4000 g/in, or 5000 g/in, or 10000 g/in, or 15000 g/in, or 20000 g/in; and/or (3) a wet tensile retention from 20%, or 25%, or 30% to 45%, or 50%, or 55%, or 60%, or 70%, or 80%, or 90%, or 95%, or 100%; and/or (4) an IPA tensile force from 2000 g/in, or 2500 g/in, or 3000 g/in to 4000 g/in, or 4500 g/in, or 5000 g/in, or 10000 g/in, or 15000 g/in, or 20000 g/in; and/or (5) an IPA tensile retention from 35%, or 40%, or 43% to 50%, or 55%, or 60%, or 70%, or 80%, or 90%, or 95%, or 100%; and/or (6) a 60° gloss from greater than 0%, or 0.1%, or 0.5%, or 0.6% to 8.2%, or 8.5%, or 9.0%; and/or (7) an 85° gloss from greater than 0%, or 1%, or 5%, or 7% to 8%, or 10%, or 15%, or 20%; and/or (8) a tack rating from 1 to 2.

An article, such as those described above, can typically be made by contacting the nonwoven textile with the aqueous composition, and then evaporating the water, by exposure to moving air, by exposure to a temperature above 25° C., or a combination thereof. Nonlimiting methods of contacting the nonwoven textile with the present aqueous composition include immersing, brushing, spraying, dipping, pouring, and combinations thereof. Bounded by no particular theory, it is believed that during or after evaporation of the water, latent crosslinking groups on the MSLPP will undergo chemical reactions with each other to form covalent bonds between the MSLPP. It is believed that the bonds formed by the latent crosslinking groups will connect the first-stage polymer to the second-stage polymer, and will also connect polymer chains residing in different MSLPPs.

In an embodiment, the aqueous composition is brought into contact with a nonwoven textile, such as in the form of a flat mat, in which the fibers may or may not be bonded to each other prior to contact with the aqueous composition. The water is evaporated, or substantially evaporated, from the aqueous composition to form a coating that is in contact with the nonwoven textile.

Nonlimiting examples of suitable articles include clothing, towels, bedding, blankets, signs, wipes, filters, shoes, bags, toys, flags, furnishings, curtains, carpet, carpet backing, wall coverings, automotive applications (e.g., head liners, hood liners, flooring, upholstery), and combinations thereof.

The article may comprise two or more embodiments disclosed herein.

By way of example, and not limitation, some embodiments of the present disclosure will now be described in detail in the following Examples.

EXAMPLES

The monomers used in the examples are provided in Table 1 below.

TABLE 1

| Monomers | |
|---|---|
| 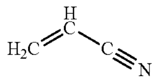<br>acrylonitrile (AN) | 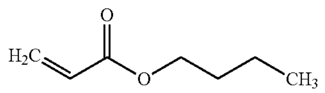<br>butyl acrylate (BA) |
| 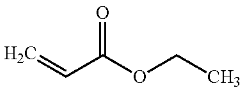<br>ethyl acrylate (EA) | 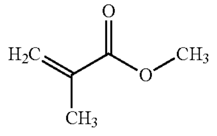<br>methyl methacrylate (MMA) |
| 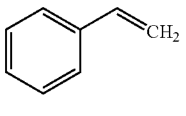<br>styrene (STY) | 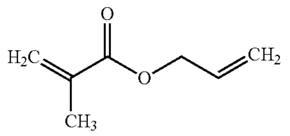<br>allylmethacrylate (ALMA) |
| 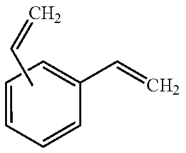<br>divinylbenzene (DVB) | 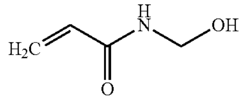<br>n-methylol acrylamide (MOA) |
| 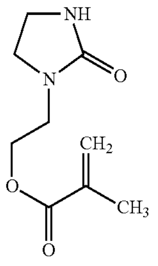<br>n-(2-methacryloyloxyethylene) ethylene urea (MAEEU) | |

A. Representative Preparation of Aqueous Compositions Containing Binder Particles The aqueous compositions containing binder particles of Sample 1 and Sample 11 are formed in a 2-stage emulsion polymerization using the following polymerization procedure.

1. Set a water bath temperature at 40° C. and an agitation speed at 75 rotations per minute (RPM). Charge A (of Table 2) to a reaction bottle and purge the bottle with $N_2$ for 5 minutes.
2. Purge reaction mixture B (of Table 2) with $N_2$ for 5 minutes, and transfer it to the reaction bottle containing A.
3. Purge the reaction bottle containing A and B with $N_2$, and quickly cap the bottle with a gasket. Place the capped reaction bottle in the water bath.

4. Purge C and D (of Table 2) with $N_2$ for 5 minutes, and then inject C and D into the reaction bottle containing A and B. Agitate the reaction bottle for 120 minutes at a temperature of 40° C.
5. Purge E and F (of Table 2) with $N_2$ for 5 minutes, and then inject into the reaction bottle. Agitate the reaction bottle for 60 minutes at a temperature of 40° C.
6. Purge the second-stage mixture G (of Table 2) with $N_2$ for 5 minutes, and then inject into the reaction bottle.
7. Purge H (of Table 2) with $N_2$ for 5 minutes, and inject into the reaction bottle. Agitate the reaction bottle for 60 minutes at a temperature of 40° C.
8. Purge I and J (of Table 2) with $N_2$ for 5 minutes, and inject into the reaction bottle. Agitate the reaction bottle overnight at a temperature of 40° C.
9. Cool to room temperature (23° C.), collect the latex polymer sample, and characterize the 1st stage/2nd stage latex polymer sample.

TABLE 2

Exemplary Polymerization Components

| | Component | Sample 11 Weight (g) | Sample 1 Weight (g) |
|---|---|---|---|
| | First Stage | | |
| A | deionized (DI) water | 20.00 | 20.00 |
| | seed 20611XP[5] | 4.41 | 4.41 |
| | seed 20007[5] | 14.07 | 14.07 |
| B | DI water | 50.00 | 50.00 |
| | sodium carbonate | 0.034 | 0.034 |
| | sodium sulfate (surfactant) | 0.101 | 0.101 |
| | sodium laurel sulfate[1] (surfactant) | 1.829 | 1.829 |
| | methyl methacrylate (MMA) | 30.726 | — |
| | n-methylol acrylamide[4] (MOA) | 2.4 | — |
| | ethyl acrylate (EA) | 31.36 | 31.136 |
| | butyl acrylate (BA) | — | 31.136 |
| C | iso-ascorbic acid | 0.083 | 0.083 |
| | DI water | 5.00 | 5.00 |
| D | t-butyl hydroperoxide[2] | 0.068 | 0.068 |
| | DI water | 5.00 | 5.00 |

TABLE 2-continued

Exemplary Polymerization Components

| | Component | Sample 11 Weight (g) | Sample 1 Weight (g) |
|---|---|---|---|
| E | iso-ascorbic acid | 0.067 | 0.067 |
| | DI water | 5.00 | 5.00 |
| F | t-butyl hydroperoxide[2] | 0.055 | 0.055 |
| | DI water | 5.00 | 5.00 |
| | Second Stage | | |
| G | sodium carbonate | 0.04 | 0.04 |
| | sodium laurel sulfate[1] (surfactant) | 0.457 | 0.457 |
| | methyl methacrylate (MMA) | 7.68 | — |
| | ethyl acrylate (EA) | 7.74 | 7.784 |
| | butyl acrylate (BA) | — | 7.784 |
| | n-(2-methacryloyloxyethylene) ethylene urea (MAEEU) | 4.71 | — |
| | n-methylol acrylamide[3] (MOA) | — | 2.025 |
| H | sodium persulfate | 0.043 | 0.043 |
| | DI water | 5.00 | 5.00 |
| I | iso-ascorbic acid | 0.121 | 0.121 |
| | DI water | 5.00 | 5.00 |
| J | t-butyl hydroperoxide[2] | 0.076 | 0.076 |
| | DI water | 5.00 | 5.00 |

[1]Sodium laurel sulfate is POLYSTEP™ B-5-N, available from Stepan Company, containing 28 wt % sodium laurel sulfate in water.
[2]t-butyl hydroperoxide is an organic peroxide, available from Sigma-Aldrich, containing 70 wt % t-butyl hydroperoxide in water.
[3]n-methylolacrylamide, available from SNF Floerger under the trade name FLOCRYL MLAM 48, containing 48 wt % n-methylolacrylamide in water.
[4]n-methylol acrylamide, available from SNF Floerger under the trade name FLOCRYL MOA 45, containing 45 wt % n-methylol acrylamide in water.
[5]Seed 20611XP and Seed 20007 each is an aqueous dispersion of acrylic oligomer seed (33 wt % solids, 67 wt % butyl acrylate/18 wt % n-dodecyl mercaptan/14.8 wt % methyl methacrylate/0.2 wt % methacrylic acid) with a $D_{50}$ particle size of 885 nm and a coefficient of variation of 5%, as determined by DCP, and a weight average molecular weight (Mw) of 2532 g/mole, prepared substantially as described in U.S. Pat. No. 8,686,096, Examples 1 and 5 (col. 19 and 20), the entire contents of which are herein incorporated by reference.

Aqueous composition Samples 1-12 are prepared using the above-described procedure for preparing Samples 1 and 11. In each sample, the weight ratio of dry first-stage polymer to dry second-stage polymer is 80:20.

Aqueous composition Sample 13 is a single-stage polymer that lacks a second-stage polymer.

The composition and properties of aqueous composition Samples 1-13 are provided below in Table 3.

TABLE 3

Aqueous Compositions Containing MSLPP Binder Particles

| | First-Stage Polymer | Second-Stage Polymer | $D_{50}$ (μm) | Total HCHO Content (150° C., 30 min) | Free HCHO Content (150° C., 4 min) | Nash HCHO Content |
|---|---|---|---|---|---|---|
| Sample 1 | 50 wt % EA<br>50 wt % BA | 48.65 wt % EA<br>48.65 wt % BA<br>2.7 wt % MOA[1] | 0.2177 | 668 ppm | 675 ppm | 274 ppm |
| Sample 2 | 50 wt % EA<br>50 wt % BA | 47.89 wt % EA<br>47.89 wt % BA<br>4.23 wt % MAEEU | 0.2049 | 39.4 ppm | <10 ppm | 0.9 ppm |
| Inventive Sample 3 | 48.65 wt % EA<br>48.65 wt % BA<br>2.7 wt % MOA[1] | 47.89 wt % EA<br>47.89 wt % BA<br>4.23 wt % MAEEU | 0.3500 | 114 ppm | 18 ppm | 0.7 ppm |
| Inventive Sample 4 | 47.89 wt % EA<br>47.89 wt % BA<br>4.23 wt % MAEEU | 48.65 wt % EA<br>48.65 wt % BA<br>2.7 wt % MOA[1] | 0.2624 | 153 ppm | 101 ppm | 2.5 ppm |
| Sample 5 | 51.19 wt % BA<br>48.81 wt % STY | 48.65 wt % BA<br>46.25 wt % STY<br>5.11 wt % MOA[1] | — | 1228 ppm | 452 ppm | 359 ppm |
| Sample 6 | 51.19 wt % BA<br>48.81 wt % STY | 50.09 wt % BA<br>47.69 wt % STY<br>7.99 wt % MAEEU | — | 25.1 ppm | <10 ppm | <1 ppm |
| Inventive Sample 7 | 48.65 wt % BA<br>46.25 wt % STY<br>5.11 wt % MOA[1] | 50.09 wt % BA<br>47.69 wt % STY<br>7.99 wt % MAEEU | 0.2930 | 142 ppm | 12 ppm | 1.9 ppm |

TABLE 3-continued

| Aqueous Compositions Containing MSLPP Binder Particles | | | | | | |
|---|---|---|---|---|---|---|
| | First-Stage Polymer | Second-Stage Polymer | $D_{50}$ (μm) | Total HCHO Content (150° C., 30 min) | Free HCHO Content (150° C., 4 min) | Nash HCHO Content |
| Inventive Sample 8 | 50.09 wt % BA<br>47.69 wt % STY<br>7.99 wt % MAEEU | 48.65 wt % BA<br>46.25 wt % STY<br>5.11 wt % MOA[1] | — | 108 ppm | 11 ppm | 2.1 ppm |
| Sample 9 | 50.49 wt % EA<br>49.51 wt % MMA | 48.99 wt % EA<br>48.01 wt % MMA<br>3.00 wt % MOA[2] | — | 319 ppm | 234 ppm | 76 ppm |
| Sample 10 | 50.49 wt % EA<br>49.51 wt % MMA | 48.14 wt % EA<br>47.15 wt % MMA<br>4.71 wt % MAEEU | — | 26.1 ppm | <10 ppm | 0.4 ppm |
| Inventive Sample 11 | 48.99 wt % EA<br>48.01 wt % MMA<br>3.00 wt % MOA[2] | 48.14 wt % EA<br>47.15 wt % MMA<br>4.71 wt % MAEEU | 0.4410 | 91.7 ppm | 13 ppm | 0.9 ppm |
| Inventive Sample 12 | 48.14 wt % EA<br>47.15 wt % MMA<br>4.71 wt % MAEEU | 48.99 wt % EA<br>48.01 wt % MMA<br>3.00 wt % MOA[2] | — | 76.0 ppm | 25 ppm | 5.2 ppm |
| Sample 13 | 48.65 wt % EA<br>48.65 wt % BA<br>2.7 wt % MOA[1] | — | — | NM | NM | NM |

[1]n-methylolacrylamide, available from SNF Floerger under the trade name FLOCRYL MLAM 48, containing 48 wt % n-methylolacrylamide in water.
[2]n-methylol acrylamide, available from SNF Floerger under the trade name FLOCRYL MOA 45, containing 45 wt % n-methylol acrylamide in water.

Aqueous composition Samples 1-4, 9, 11 and 12 are coated onto a Grade 4 WHATMAN™ filter paper (a non-woven textile, 2.5 oz/yard (86 g/cm) formed from wet laid wood pulp) by coating the filter paper with aqueous composition. Specifically, the filter paper is immersed in 300 mL of the aqueous composition for a period of from greater than 0.1 seconds to less than 1 minute, (ii) removed from the aqueous composition, (iii) padded by a Mathis' padder, and (iv) dried and crosslinked in an oven at a temperature of 150° C. for 3 minutes to form a crosslinked article. The add-on of the polymer particles is controlled to be 25 wt % of the total crosslinked article. An article with a coating in contact with the nonwoven textile is formed. The properties of article samples with coatings formed from aqueous composition Samples 1-4, 9, 11 and 12 are provided below in Table 4.

In Table 3 and 4, weight percents are based on the total weight of the respective first-stage polymer and second-stage polymer. In other words, the first-stage polymer of Sample 1 contains 50 wt % EA and 50 wt % BA, based on the total weight of the first-stage polymer. In Tables 3 and 4, "HCHO" refers to formaldehyde, and "NM" indicates a value that is not measured.

TABLE 4

| Properties of Articles containing MSLPP Binder Particles | | | | | | | |
|---|---|---|---|---|---|---|---|
| | First-Stage Polymer | Second-Stage Polymer | Dry Tensile Force (g/in) | Wet Tensile Force (g/in) | Wet Tensile Retention (%) | IPA Tensile Force (g/in) | IPA Tensile Retention (%) |
| Sample 1 | 50 wt % EA<br>50 wt % BA | 48.65 wt % EA<br>48.65 wt % BA<br>2.7 wt % MOA[1] | 6866.95 | 3486.37 | 51 | 3567.51 | 52 |
| Sample 2 | 50 wt % EA<br>50 wt % BA | 47.89 wt % EA<br>47.89 wt % BA<br>4.23 wt % MAEEU | 5558.55 | 1049.29 | 19 | 1744.28 | 31 |
| Inventive Sample 3 | 48.65 wt % EA<br>48.65 wt % BA<br>2.7 wt % MOA[1] | 47.89 wt % EA<br>47.89 wt % BA<br>4.23 wt % MAEEU | 7154.86 | 2157.67 | 30 | 3052.76 | 43 |
| Inventive Sample 4 | 47.89 wt % EA<br>47.89 wt % BA<br>4.23 wt % MAEEU | 48.65 wt % EA<br>48.65 wt % BA<br>2.7 wt % MOA[1] | 7011.80 | 3304.65 | 47 | 4137.35 | 59 |
| Sample 9 | 50.49 wt % EA<br>49.51 wt % MMA | 48.99 wt % EA<br>48.01 wt % MMA<br>3.00 wt % MOA[2] | 8716.23 | 4870.78 | 56 | 4721.96 | 54 |
| Inventive Sample 11 | 48.99 wt % EA<br>48.01 wt % MMA<br>3.00 wt % MOA[2] | 48.14 wt % EA<br>47.15 wt % MMA<br>4.71 wt % MAEEU | 7445.32 | 3307.33 | 44 | 3654.98 | 49 |
| Inventive Sample 12 | 48.14 wt % EA<br>47.15 wt % MMA<br>4.71 wt % MAEEU | 48.99 wt % EA<br>48.01 wt % MMA<br>3.00 wt % MOA[2] | 6113.82 | 3769.46 | 62 | 4633.90 | 76 |

[1]n-methylolacrylamide, available from SNF Floerger under the trade name FLOCRYL MLAM 48, containing 48 wt % n- methylolacrylamide in water.
[2]n-methylol acrylamide, available from SNF Floerger under the trade name FLOCRYL MOA 45, containing 45 wt % n-methylol acrylamide in water.

Samples 1, 5, and 9 are aqueous compositions containing binder particles with (A) a first-stage polymer containing a first vinyl monomer, but lacking MOA; and (B) a second stage polymer containing a second vinyl monomer and MOA (rather than MAEEU). Samples 1, 5, and 9 each exhibits a Nash HCHO content significantly greater than 10.0 ppm (274 ppm, 359 ppm, and 76 ppm, respectively), as shown in Table 3. Thus, Samples 1, 5, and 9 demonstrate that formaldehyde is formed during the emulsion polymerization of MOA. Because Samples 1, 5, and 9 each exhibits a Nash HCHO content greater than 10.0 ppm, articles with a coating formed from Samples 1, 5, and 9 are not suitable for use in automotive applications, such as head liners and hood liners.

Samples 2, 6, and 10 are aqueous compositions containing binder particles with (A) a first-stage polymer containing a first vinyl monomer, but lacking MOA; and (B) a second stage polymer containing a second vinyl monomer and MAEEU. Thus, Samples 2, 6, and 10 do not contain a monomer (MOA) that generates formaldehyde and therefore exhibit a Nash HCHO content of less than 10.0 ppm, as shown in Table 3. However, Table 4 shows that an article with a coating formed from Sample 2 exhibits (i) a wet tensile retention of less than 20% and (ii) an IPA tensile retention of less than 35%. Articles with a wet tensile retention of less than 20% are not suitable for article applications that are conventionally exposed to water, such as clothing that should be washable, because the article will fray or break apart after being exposed to water.

Applicant unexpectedly found that aqueous compositions containing binder particles with (A) a first-stage polymer containing MOA and a first vinyl monomer; and (B) a second stage polymer containing MAEEU and a second vinyl monomer (Samples 3, 7, and 11) advantageously exhibit a suitable Nash HCHO content of less than 2.0 ppm, as shown in Table 3. Additionally, Table 4 shows that an article with a coating formed from Sample 3 or 11 surprisingly exhibits both (i) a wet tensile retention of at least 20% and (ii) an IPA tensile retention of at least 35%. Consequently, articles with a coating formed from Sample 3 or 11 are suitable for article applications that are conventionally exposed to water, such as clothing that should be washable.

Applicant unexpectedly found that aqueous compositions containing binder particles with (A) a first-stage polymer containing MAEEU (rather than MOA) and a first vinyl monomer; and (B) a second stage polymer containing MOA (rather than MAEEU) and a second vinyl monomer (Samples 4, 8, and 12 are) advantageously exhibit a Nash HCHO content of content less than 10 ppm, as shown in Table 3. Consequently, articles with a coating formed from Samples 4, 8, and 12 are suitable for use in automotive applications, such as head liners and hood liners.

B. Aqueous Compositions Containing Microsphere Particles

An aqueous dispersion of acrylic oligomer seed (AOS) is prepared as described in U.S. Pat. No. 8,686,096, Examples 1 and 5 (col. 19 and 20). The aqueous dispersion has a solids content of 33 wt %. The acrylic oligomer seed includes 67 wt % butyl acrylate (BA); 18 wt % n-dodecyl mercaptan; 14.8 wt % methyl methacrylate (MMA); and 0.2 wt % methacrylic acid (MAA). The acrylic oligomer seed has a $D_{50}$ particle size of 855 nm (0.855 μm), and a coefficient of variation of 5%, as determined by Disc Centrifuge Photosedimentometry (DCP). The acrylic oligomer seed has a weight average molecular weight (Mw) of 2,532 g/mol.

A first monomer emulsion (ME 1) for Samples 14-16 is prepared in a first flask by combining DI water (218 g), Siponate™ DS-4 branched alkylbenzene sulfonate (7.27 g, 22.5 wt % aq. solution, sodium dodecylbenzenesulfonate), n-butyl acrylate (BA, 444.13 g), and ALMA (18.53 g). The first monomer emulsion (ME 1) of Sample 17 is prepared in a flask that also includes MOA (11.28 g) (available from SNF Floerger under the trade name FLOCRYL MOA 45, containing 45 wt % n-methylol acrylamide in water).

An initiator emulsion (IE) is prepared in a separate vial by combining DI water (8.4 g), Siponate™ DS-4 (0.091 g, 22.5 wt % aq. solution), and t-butyl peroxy-2-ethylhexanoate (TBPEH, 2.4 g, 98 wt % active). The IE is emulsified for 5 min with a homogenizer at 5,000 rpm.

DI water (730.6 g) is added to a 2-stage emulsion polymerization reactor and heated to 90° C., after which time the acrylic oligomer seed (AOS) (5.65 g, 33% solids) is added to the reactor, followed by the addition of the first monomer emulsion (ME 1) over 15 min. After a 60 minute hold, the initiator emulsion (IE) is shot added to the reactor, which starts the polymerization reaction. Exotherm causes the reactor temperature to rise to 90° C. At the peak exotherm temperature, the reaction is held for 5 minutes, and then cooled to 78° C.

A shot of isoascorbic acid (IAA) (0.175 g in 5.6 g of water) is added to the reactor.

A second monomer emulsion (ME 2) is prepared in a separate flask. The components of the second monomer emulsion (ME 2) of Samples 14-17 are provided below in Table 5.

TABLE 5

Second Monomer Emulsion (ME 2) Components

| | Sample 14 | Sample 15 | Sample 16 | Sample 17 |
|---|---|---|---|---|
| DI water | 46.8 g | 46.8 g | 46.8 g | 46.8 g |
| Siponate ™ DS-4 (surfactant)[3] | 1.41 g | 1.41 g | 1.41 g | 1.41 g |
| methyl methacrylate (MMA) | 100 g | 100 g | 100 g | 100 g |
| methacryloxy ethyl ethylene urea (MAEEU) | — | — | 11.28 g | 11.28 g |
| n-methylol acrylamide (MOA)[1] | — | 11.28 g | — | — |
| n-methylol acrylamide (MOA)[2] | 11.28 g | — | — | — |
| ethyl acrylate (EA) | 4.8 g | 4.8 g | 4.8 g | 4.8 g |

[1]n-methylolacrylamide, available from SNF Floerger under the trade name FLOCRYL MLAM 48, containing 48 wt % n-methylolacrylamide in water.
[2]n-methylol acrylamide, available from SNF Floerger under the trade name FLOCRYL MOA 45, containing 45 wt % n-methylol acrylamide in water.
[3]Siponate ™ DS-4 branched alkylbenzene sulfonate (22.5 wt % aq. solution, sodium dodecylbenzenesulfonate).

The second monomer emulsion (ME 2), t-butyl hydroperoxide solution (t-BHP, 0.649 g, (70 wt % in 39.7 g water), and IAA (0.29 g in 39.7 water) are fed into the reactor over 45 minutes. The residual monomers are then chased by feeding $FeSO_4.7H_2O$ (0.07 g), t-BHP solution (1.12 g (70% aq.) in 21.2 g water), and IAA (0.56 g in 15.6 g water) into the reactor. The resulting dispersion is thickened using ACRYSOL™ ASE-60 rheology modifier (available from The Dow Chemical Company), followed by neutralization. A biocide is added to preserve the resulting dispersion. The dispersion is filtered through a 45-μm screen. Gel that remains on the screen is collected and dried (0.5 wt %). The filtrate is analyzed for percent solids.

The composition of Samples 14-17 is provided below in Table 6. In Table 6, weight percents are based on the total weight of the respective first-stage polymer and second-stage polymer. In other words, the first-stage polymer of Sample 14 contains 96 wt % BA and 4 wt % ALMA, based on the total weight of the first-stage polymer.

TABLE 6

| Aqueous Compositions Containing MSLPP Microsphere Particles | | | | |
|---|---|---|---|---|
| | Sample 14 | Sample 15 | Sample 16 | Inventive Sample 17 |
| First-Stage Polymer | 96 wt % BA<br>4 wt % ALMA | 96 wt % BA<br>4 wt % ALMA | 96 wt % BA<br>4 wt % ALMA | 94 wt % BA<br>4 wt % ALMA<br>2 wt % MOA[2] |
| Second-Stage Polymer | 86 wt % MMA<br>4 wt % EA<br>10 wt % MOA[2] | 86 wt % MMA<br>4 wt % EA<br>10 wt % MOA[1] | 86 wt % MMA<br>4 wt % EA<br>10 wt % MAEEU | 86 wt % MMA<br>4 wt % EA<br>10 wt % MAEEU |
| First-Stage:Second-Stage Weight Ratio | 80:20 | 80:20 | 80:20 | 80:20 |
| $D_{50}$ Particle Size (μm) | 5.1 | 5.2 | 5.4 | 5.5 |

[1]n-methylolacrylamide, available from SNF Floerger under the trade name FLOCRYL MLAM 48, containing 48 wt % n-methylolacrylamide in water.
[2]n-methylol acrylamide, available from SNF Floerger under the trade name FLOCRYL MOA 45, containing 45 wt % n-methylol acrylamide in water.

C. Coating Compositions Containing Binder Particles and Microsphere Particles

Matte, clear coating composition samples are prepared in a plastic paint container while stirring using a 3-prong stirring rod. One of Samples 14, 16, or 17 (as described above) is added as a dispersion to the container followed by (i) water, (ii) thickener, (iii) one of Samples 2, 11, or 13 (as described above), and (iv) base (aqueous ammonia hydroxide, 28 wt % solution). The mixture is stirred for 5 minutes, and then a drawdown is prepared using a 3 mil bird drawdown bar over a Leneta 5C opacity chart. The coating is dried in a 105° C. forced air oven for 5 minutes.

The composition and properties of each coating composition sample are provided below in Table 7.

TABLE 7

| Coating Compositions Containing Binder Particles and Microsphere Particles | | | | |
|---|---|---|---|---|
| | Inventive Coating Sample 18 | Inventive Coating Sample 19 | Coating Sample 20 | Coating Sample 21 |
| Inventive Sample 17 (microsphere) (25.5 wt % solids) | 29.4 g | 82.3 g | — | — |
| Sample 16 (microsphere) (24.5 wt % solids) | — | — | 30.6 g | — |
| Sample 14 (microsphere) (21.7 wt % solids) | — | — | — | 34.6 g |
| DI water | 17.5 g | — | 18.8 g | 13.8 g |
| ACRYSOL ™ ASE-60[1] | 2.0 g | 2.0 g | 2.0 g | 2.0 g |
| Inventive Sample 11 (binder) (44.9 wt % solids) | 50.1 g | 20.0 g | — | — |
| Sample 2 (binder) (47.1 wt % solids) | — | — | 47.8 g | — |
| Sample 13 (binder) (46.3 wt % solids) | — | — | — | 48.6 g |
| aqueous ammonia hydroxide | 1.0 g | 1.0 g | 1.0 g | 1.0 g |
| Total (g) | 100.0 g | 105.3 g | 100.2 g | 100.0 g |
| 60° Gloss (%) | 8.2 | 0.6 | 6.6 | 9.3 |
| 85° Gloss (%) | 19.7 | 7.5 | 16.6 | 21.1 |
| Tack Rating[2] | 2 | 1 | 4 | 3 |

[1]ACRYSOL ™ ASE-60 rheology modifier (available from The Dow Chemical Company).
[2]Tack is determined by rubbing the surface of a coated specimen by hand. A subjective ranking from 1-4 is applied after rubbing the coating surface. A ranking of 1 represents the coating with the lowest tack, while rating of 4 represents the coating with the highest tack.

Applicant unexpectedly found that articles (Samples 18 and 19) with coatings formed from aqueous compositions including both (1) binder particles (Sample 11) with (A) a first-stage polymer including EA, MMA, and MOA, and (B) a second-stage polymer including EA, MMA, and MAEEU; and (2) microsphere particles (Sample 17) with (A) first-stage polymer including BA, ALMA, and MOA; and (B) second-stage polymer including MMA, EA, and MAEEU, exhibit (i) low tack, as evidenced by a tack rating of 1 or 2, (ii) a 60° gloss of less than 9%, and (iii) an 85° gloss of less than 20%. Low tack, as evidenced by a tack rating of 1 or 2, indicates the articles exhibit improved haptics, higher blocking resistance, and lower dirt pickup than comparative articles with a higher tack rating (of 3 or 4). Consequently, the present articles are low gloss, haptic coatings that are suitable for coating flexible and rigid substrates.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. An aqueous composition comprising multi-stage latex polymer particles comprising:
(1) from 1 wt % to 40 wt % binder particles having a $D_{50}$ particle size from 0.03 μm to less than 1 micron, the binder particles comprising:
(A) a first-stage polymer comprising
(i) an n-methylol-functional monomer;
(ii) a first vinyl monomer;
(B) a second-stage polymer comprising
(i) a formaldehyde-scavenging monomer;
(ii) a second vinyl monomer; and
the first-stage polymer is bound to the second-stage polymer;
(2) from 5 wt % to 80 wt % microsphere particles having a $D_{50}$ particle size from 1 μm to 20 μm wherein weight percent is based on total weight of the aqueous composition, the microsphere particles comprising
(A) a first-stage polymer comprising
(i) an n-methylol-functional monomer;
(ii) a first vinyl monomer;
(B) a second-stage polymer comprising
(i) a formaldehyde-scavenging monomer;
(ii) a second vinyl monomer; and
the first-stage polymer is bound to the second-stage polymer.

2. The aqueous composition of claim 1, wherein the first vinyl monomer and the second vinyl monomer in the binder particles and in the microsphere particles each is independently selected from the group consisting of acrylonitrile, butyl acrylate, ethyl acrylate, methyl methacrylate, allylmethacrylate, styrene, divinylbenzene, and combinations thereof.

3. The aqueous composition of claim 1, wherein the composition has a Nash formaldehyde content from 0 to 10.0 ppm.

4. An article comprising a nonwoven textile in contact with the aqueous composition of claim 1.

5. The aqueous composition of claim 1 wherein the microsphere particles have a $D_{50}$ particle size from 2 μm to 20 μm.

6. The aqueous composition of claim 5 wherein the binder particles (1) first-stage polymer (A) first vinyl monomer (ii) comprises at least two different (meth) acrylate monomers.

7. The aqueous composition of claim 6 wherein the binder particles (1) second-stage polymer (B) second vinyl monomer (ii) comprises at least two different (meth) acrylate monomers.

8. An aqueous composition comprising multi-stage latex polymer particles comprising:

(1) from 1 wt % to 40 wt % binder particles having a $D_{50}$ particle size from 0.03 μm to less than 1 micron, the binder particles comprising:

(A) a first-stage polymer comprising (i) n-methylol acrylamide;

(ii) a first vinyl monomer;

(B) a second-stage polymer comprising (i) n-(2-methacryloyloxyethylene) ethylene urea;

(ii) a second vinyl monomer; and the first-stage polymer is bound to the second-stage polymer; and (2) from 5 wt % to 80 wt % microsphere particles having a $D_{50}$ particle size from 1 μm to 20 μm wherein weight percent is based on total weight of the aqueous composition, the microsphere particles comprising (A) a first-stage polymer comprising (i) n-methylol acrylamide;

(ii) a first vinyl monomer;

(B) a second-stage polymer comprising (i) n-(2-methacryloly oxyethylene) ethylene urea;

(ii) a second vinyl monomer; and the first-stage polymer is bound to the second-stage polymer.

9. The aqueous composition of claim 8, wherein the binder particles (1) first-stage polymer (A) comprises from 1 wt % to 10 wt %, based on the dry weight of the first-stage polymer, polymerized units of the n-methylol acrylamide.

10. The aqueous composition of claim 8, wherein the binder particles (1) second-stage polymer (B) comprises from 1 wt % to 15 wt %, based on the dry weight of the second-stage polymer, polymerized units of the n-(2-methacryloyloxyethylene) ethylene urea.

11. The aqueous composition of claim 8 wherein the microsphere particles have a $D_{50}$ particle size from 2 μm to 20 μm.

12. The aqueous composition of claim 11 wherein the binder particles (1) first-stage polymer (A) first vinyl monomer (ii) comprises at least two different (meth) acrylate monomers.

13. The aqueous composition of claim 12 wherein the binder particles (1) second-stage polymer (B) second vinyl monomer (ii) comprises at least two different (meth) acrylate monomers.

14. An article comprising:

a nonwoven textile;

a coating on the textile, the coating comprising a composition comprising multi-stage latex polymer particles comprising (1) from 1 wt % to 40 wt % binder particles having a $D_{50}$ particle size from 0.03 μm to less than 1 micron, the binder particles comprising:

(A) a first-stage polymer comprising (i) n-methylol acrylamide;

(ii) a first vinyl monomer;

(B) a second-stage polymer comprising (i) n-(2-methacryloyloxyethylene) ethylene urea;

(ii) a second vinyl monomer; and the first-stage polymer is bound to the second-stage polymer; and (2) from 5 wt % to 80 wt % microsphere particles having a $D_{50}$ particle size from 1 μm to 20 μm wherein weight percent is based on total weight of the coating, the microsphere particles comprising (A) a first-stage polymer comprising (i) an n-methylol-functional monomer;

(ii) a first vinyl monomer;

(B) a second-stage polymer comprising (i) a formaldehyde-scavenging monomer;

(ii) a second vinyl monomer; and the first-stage polymer is bound to the second-stage polymer.

15. The article of claim 14, wherein the first-stage polymer comprises from 1 wt % to 10 wt %, based on the dry weight of the first-stage polymer, polymerized units of the n-methylol acrylamide.

16. The article of claim 14, wherein the second-stage polymer comprises from 1 wt % to 15 wt %, based on the dry weight of the second-stage polymer, polymerized units of the n-(2-methacryloyloxyethylene) ethylene urea.

17. The article of claim 14, wherein the first vinyl monomer and the second vinyl monomer each is independently selected from the group consisting of acrylonitrile, butyl acrylate, ethyl acrylate, methyl methacrylate, allylmethacrylate, styrene, divinylbenzene, and combinations thereof.

18. The article of claim 14, wherein the composition has a Nash formaldehyde content from 0 to 10.0 ppm and the article has a wet tensile retention from 30% to 100%.

19. The article of claim 14, wherein the article has a tack rating from 1 to 2.

* * * * *